(12) United States Patent
Dobson, Jr. et al.

(10) Patent No.: US 6,936,575 B2
(45) Date of Patent: Aug. 30, 2005

(54) BORATE CROSSLINKER SUSPENSIONS WITH MORE CONSISTENT CROSSLINK TIMES

(75) Inventors: James W. Dobson, Jr., Houston, TX (US); Shauna Leigh Hayden, Houston, TX (US); Belinda E. Hinojosa, Houston, TX (US)

(73) Assignee: Texas United Chemical Company, LLC., Houston, TX (US)

( * ) Notice: Subject to any disclaimer, the term of this patent is extended or adjusted under 35 U.S.C. 154(b) by 255 days.

(21) Appl. No.: 10/265,346

(22) Filed: Oct. 7, 2002

(65) Prior Publication Data

US 2004/0067854 A1 Apr. 8, 2004

(51) Int. Cl.$^7$ ................................................ C09K 3/00
(52) U.S. Cl. ........................ 507/273; 507/922; 507/903
(58) Field of Search .................... 507/273, 903, 507/922; 166/308.3, 308.5

(56) References Cited

U.S. PATENT DOCUMENTS

| | | | | |
|---|---|---|---|---|
| 2,773,757 A | * | 12/1956 | Connell et al. | ............. 504/187 |
| 4,619,776 A | * | 10/1986 | Mondshine | ................. 507/211 |
| 4,620,596 A | * | 11/1986 | Mondshine | ................. 166/292 |
| 5,565,513 A | * | 10/1996 | Kinsey et al. | ............... 524/405 |
| 2003/0144154 A1 | * | 7/2003 | Dobson et al. | ............. 507/200 |

* cited by examiner

*Primary Examiner*—Philip C. Tucker
(74) *Attorney, Agent, or Firm*—Roy F. House

(57) ABSTRACT

The invention provides an aqueous suspension/concentrate of a sparingly soluble borate, preferably as disclosed in Mondshine U.S. Pat. No. 4,619,776, which is effective in crosslinking aqueous solutions of a water soluble, borate-crosslinkable polymer, preferably guar gum and derivatives thereof. The aqueous suspension/concentrate comprises a saturated aqueous solution of a sparingly soluble borate, a suspension agent, suspended particles of a sparingly soluble borate, and optionally a stabilizing agent, wherein the saturated solution of the sparingly soluble borate is prepared prior to the particles of the sparingly soluble borate being suspended therein. The preferred suspension agent is a palygorskite clay such as attapulgite and sepiolite. The invention further provides a method of hydraulically fracturing a formation with the aqueous borate suspension/concentrate.

11 Claims, No Drawings

BORATE CROSSLINKER SUSPENSIONS WITH MORE CONSISTENT CROSSLINK TIMES

FIELD OF THE INVENTION

The invention relates to viscous aqueous fluids, such as hydraulic fracturing fluids for oil and gas wells, containing a galactomannan polymer crosslinked with boron, and to aqueous borate suspensions for affecting such crosslinking.

BACKGROUND OF THE INVENTION

It is well known that organic polyhydroxy compounds having hydroxyl groups positioned in the cis-form on adjacent carbon atoms or on carbon atoms in a 1,3-relationship react with borates to form five or six member ring complexes. At alkaline pH above about 8.0 these complexes form didiol crosslinked complexes. This leads to a valuable reaction with dissociated borate ions in the presence of polymers having the required hydroxyl groups in a cis-relationship. The reaction is fully reversible with changes in pH. An aqueous solution of the polymer will gel in the presence of borate when the solution is made alkaline, and will liquefy again when the pH is lowered below about 8. If the dry powdered polymer is added to an alkaline borate solution, it will not hydrate and thicken until the pH is dropped below about 8. The critical pH at which gelation occurs is modified by the concentration of dissolved salts. The effect of the dissolved salts is to change the pH at which a sufficient quantity of dissociated borate ions exists in solution to cause gelation. The addition of an alkali metal base such as sodium hydroxide enhances the effect of condensed borates such as borax by converting the borax to the dissociated metaborate.

Known polymers which contain an appreciable content of cis-hydroxyl groups are exemplified by guar gum, locust bean gum, dextrin, polyvinyl alcohol, and derivatives of these polymers. Derivatives tend to react less with borate ions as the amount of substituting groups in the molecule increases. This results because the shear bulk of substituting groups changes the regular, alternating, and single-member branched, linear configuration of the molecule and prevents adjacent chains from approaching as closely as before, and the substitution of secondary cis-hydroxyl positions decreases the number of such unsubstituted positions available for complexing with the borate ion.

Depending on the relative concentration of polymer, and borate anion, the crosslinking reaction may produce useful gels, or may lead to insolubilization, precipitation, or unstable, non-useful gels. The viscosity of the hydrated polymer solution increases with an increase in the concentration of borate anion until a maximum is obtained. Thereafter the viscosity decreases and the gel becomes unstable as evidenced by a lumpy, inhomogeneous appearance and syneresis. As the temperature of the solution increases, the concentration of borate required to maintain the maximum degree of crosslinking, and thus maximum viscosity increases. Derivatization with non-ionic hydroxyalkyl groups greatly improves the compatibility of the polymer with most salts.

Hydraulic fracturing is a widely used method for stimulating petroleum producing subterranean formations and is commonly performed by contacting the formation with a viscous fracturing fluid having particulated solids, widely known as propping agents, suspended therein, applying sufficient pressure to the fracturing fluid to open a fracture in the subterranean formation, and maintaining this pressure while injecting the fracturing fluid into the fracture at a sufficient rate to extend the fracture into the formation. When the pressure is reduced, the propping agent within the fracture prevents the complete closure of the fracture.

The properties that a fracturing fluid should possess are amongst others, low leakoff rate, the ability to carry a propping agent, low pumping friction loss, and easy removal from the formation. Low leakoff rate is the property that permits the fluid to physically open the fracture and one that controls its areal extent. The rate of leakoff to the formation is dependent upon the viscosity and the wall-building properties of the fluid. Viscosity and wall-building properties are controlled by the addition of appropriate additives to the fracturing fluid. The ability of the fluid to suspend the propping agent is controlled by additives. Essentially, this property of the fluid is dependent upon the viscosity and density of the fluid and upon its velocity. Friction reducing additives are added to fracturing fluids to reduce pumping loss due to friction by suppression of turbulence in the fluid. To achieve the maximum benefits from fracturing, the fracturing fluid must be removed from the formation. This is particularly true with very viscous fracturing fluids. Most of such viscous fluids have built-in breaker systems that reduce the viscous gels to low viscosity solutions upon exposure to the temperatures and pressures existing in the formations. When the viscosity is lowered, the fracturing fluid may be readily produced from the formation.

The use of aqueous based fluids to formulate fracturing fluids is well known. Such fluids generally contain a water soluble polymer viscosifier. Sufficient polymer is used to suspend the propping agent, decrease the leakoff rate, and decrease the friction loss of the fracturing fluid. Supplemental additives are generally required to further decrease the leakoff rate, such as hydrocarbons or inert solids, such as silica flour.

Various water soluble polymers have been proposed for use as viscosifiers for aqueous based fracturing fluids, such as polyacrylamides, partially hydrolized polyacrylamides, and various polysaccharide polymers such as guar gum and derivatives thereof, and cellulose derivatives. However, guar gum and guar gum derivatives are the most widely used viscosifiers. Guar gum is suitable for thickening both fresh and salt water, including saturated sodium chloride brines.

It is known to provide concentrated suspensions of borate-containing crosslinking agents for the preparation of crosslinked fracturing fluids. See for example the following U.S. patents: Kinsey, III et al. U.S. Pat. No. 5,488,083; Kinsey, III et al. U.S. Pat. No. 5,565,513; Moorhouse et al., U.S. Pat. No. 6,225,264; and Moorhouse et al. U.S. Pat. No. 6,251,838. It is also known to prepare solutions of borate-containing crosslinking agents. See for example the following U.S. patents: Wadhwa U.S. Pat. No. 4,514,309; Dawson U.S. Pat. No. 5,082,579; Dawson U.S. Pat. No. 5,145,590; and Dawson U.S. Pat. No. 5,160,643.

Mondshine U.S. Pat. No. 4,619,776, incorporated herein by reference, discloses the use of sparingly soluble borates, such as alkaline earth metal borates and alkali metal alkaline earth metal borates for the controlled crosslinking of crosslinkable polymer-containing fracturing fluids. Concentrated suspensions of such borates in hydrocarbon base fluids have been utilized for the crosslinking of fracturing fluids containing guar gum or derivatives thereof, particularly hydroxypropyl guar, and have achieved commercial success. These concentrates contain an organophilic clay suspending agent to keep the borate crosslinking agent suspended therein, thus preventing settling thereof.

Concentrated aqueous suspensions of the sparingly soluble, alkaline earth or alkali metal alkaline earth metal borates having also been commercially successful. Such aqueous concentrates contain a high concentration of the sparingly soluble borate, a suspending agent, and a suspension stabilizer. A typical problem with such aqueous suspensions in fracturing operations is the variation in the time to crosslink (i.e., the crosslink time), the borate crosslinkable polymer containing fluid to produce the fracturing fluid. Thus the sparingly soluble borate particles slowly dissolve until the water eventually reaches saturation with respect to the borate salt. As the boron (borate) level in the aqueous phase increases, faster and variable crosslink times occur. Thus the degree of this variation depends upon the time and temperature of mixing and the static (aging) time of the borate suspension. These differences require the use of additives and chemicals and related costs in fracturing operations to modify the rate at which the crosslinked polymer structure forms.

Accordingly, an aqueous borate concentrate that provides a controllable crosslink time will improve over the currently available aqueous concentrate, and over the various prior art borate concentrates and solutions which contain non-aqueous solvents.

SUMMARY OF THE INVENTION

In accordance with the present invention, an aqueous concentrate of sparingly soluble alkaline earth and/or alkali metal alkaline earth metal borates is prepared utilizing a saturated aqueous solution of the borate(s) as the suspension medium (aqueous phase). One process of manufacturing the concentrate includes the steps of first saturating water with the borate(s), dispersing a suspension agent in the borate-saturated water, dispersing any other desired materials such as a suspension stabilizer in the fluid, and suspending the sparingly soluble borate(s) therein.

It is therefore an object of the invention to provide an aqueous suspension of sparingly soluble borate that provides a controllable crosslink time.

It is another object of the invention to provide a method of hydraulically fracturing a subterranean formation.

These and other objects of the invention will become evident to one of ordinary skill in the art in light of the following.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS OF THE INVENTION

The aqueous borate concentrates of this invention comprise a suspension of one or more sparingly soluble borate compounds in a saturated aqueous borate solution. The concentrates contain a suspending agent and, if necessary, a stabilizing agent.

The sparingly soluble borate compounds useful in the inventive concentrates are generally alkaline earth metal borates and/or alkali metal alkaline earth metal borates as set forth in Mondshine U.S. Pat. No. 4,619,776, incorporated herein by reference.

Exemplary minerals which are representative of these classes of borates are as follows:

Probertite: $NaCaB_5O_9\text{-}5H_2O$
Ulexite: $NaCaB_5O_9\text{-}8H_2O$
Nobleite: $CaB_6O_{10}\text{-}4H_2O$
Gowerite: $CaB_6O_{10}\text{-}5H_2O$
Frolovite: $Ca_2B_4O_8\text{-}7H_2O$
Colemanite: $Ca_2B_6O_{11}\text{-}5H_2O$
Meyerhofferite: $Ca_2B_6O_{11}\text{-}7H_2O$
Inyoite: $Ca_2B_6O_{11}\text{-}13H_2O$
Priceite: $Ca_4B_{10}O_{19}\text{-}7H_2O$
Tertschite: $Ca_4B_{10}O_{19}\text{-}20H_2O$
Ginorite: $Ca_2B_{14}O_{23}\text{-}8H_2O$
Pinnoite: $MgB_2O_4\text{-}3H_2O$
Paternoite: $MgB_2O_{13}\text{-}4H_2O$
Kurnakovite: $Mg_1B_6O_{11}\text{-}15H_2O$
Inderite: $Mg_2B_6O_{11}\text{-}15H_2O$
Preobrazhenskite: $Mg_3B_{10}O_{18}\text{-}4½H_2O$
Hydroboracite: $CaMgB_6O_{11}\text{-}6H_2O$
Inderborite: $CaMgB_6O_{11}\text{-}11H_2O$
Kaliborite (Heintzite): $KMg_2B_{11}O_{19}\text{-}9H_2O$
Veatchite: $SrB_6O_{10}\text{-}2H_2O$ The sparingly soluble borate is preferably hydrated as indicated by the minerals set forth hereinabove. The water of hydration can be varied by heating the borate at elevated temperatures to remove any amount of water desired, including complete dehydration. Thus the empirical formula for the sparingly soluble borate may be expressed as follows:

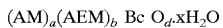

$$(AM)_a(AEM)_b \, Bc \, O_d \cdot xH_2O$$

where a, b, c and d are integers, $0 \leq a \leq 2$, $1 \leq b \leq 4$, $2 \leq c \leq 14$, $d = 0.5a + b + 1.5c$, $0 < x < 20$, AM is an alkali metal, and AEM is an alkaline earth metal. Preferably AM is Na, K, or mixtures thereof: AEM is Ca, Mg, or mixtures thereof $c \geq 5$; $0 \leq x \leq 15$.

Preferred borates are the alkaline earth metal and alkali metal alkaline earth metal borates containing at least 5 boron atoms per molecule, i.e., pentaborates, hexaborates, decaborates, and the like. Most preferably, the borates are selected from the group consisting of Ulexite, Colemanite, Probertite, and mixtures thereof.

For the purposes of this invention, "sparingly soluble" is defined as having a solubility in water at 22° C. of less than 10 kg/m³.

The suspension agents useful in the inventive aqueous concentrates are preferably palygorskite clays, most preferably selected from the group consisting of attapulgite, sepiolite, and mixtures thereof. Other inorganic suspending agents which may be useful are other clays, such as the montmorillonites (bentonite), colloidal silicas (fumed silicas), and the like as know in the art.

Water soluble polymer suspending agents known in the art may be useful in the inventive aqueous borate concentrates, such as certain natural gums, synthetic gums (called biopolymers since they are produced by bacterial or fungal action on suitable substrates), polysaccharide derivatives, and synthetic copolymers. See for example Dobson, Jr. et al. U.S. Pat. No. 5,629,271, incorporated herein by reference.

The preferred aqueous borate concentrates of the invention comprise an attapulgite suspending agent and a stabilizing agent.

Exemplary stabilizing agents are materials which decrease the API yield point of the suspensions, generally known in the art as deflocculants or "thinners", preferably alkaline earth metal tolerant compounds. Representative stabilizing agents include tannins and tannin derivatives, lignosulfonates, and synthetic polymeric compounds. The synthetic polymeric compounds are generally low molecular weight polymers or copolymers of various acrylic, acrylate, methacrylic, methacrylate, acrylamide, methacrylamide, vinyl sulfonate, N-vinyl lactam, 2-acrylamido-2-methylpropane sulfonic acid and the like polymerizable monomers. See for example the following U.S. patents, each incorporated by reference: Chen et al. U.S. Pat. No. 4,521,578; Portnoy U.S. Pat. No. 4,680,128; Matz et al. U.S. Pat. No. 5,032,295; Bloys et al. U.S. Pat. No. 5,292,367; and Stahl et al. U.S. Pat No. 6.030,928. Particularly preferred are the calcium tolerant copolymers set forth in Giddings et al. U.S. Pat. No. 4,770,795, incorporated herein by reference.

The aqueous borate concentrates are prepared by saturating the aqueous liquid used in their manufacture with the sparingly soluble borate compound. Thus a concentration of the sparingly soluble borate in excess of the amount required to form the saturated solution is mixed with the aqueous liquid for a time and at a temperature sufficient to form the saturated borate solution. The concentration of soluble boron can be determined by atomic absorption to determine when the aqueous liquid is saturated.

EXAMPLE I

An aqueous borate concentrate/suspension was prepared by saturating Houston, Tex. tap water with ulexite, dispersing 6.36 g of attapulgite in 262.5 ml of the saturated ulexite solution, suspending 174.9 g of ulexite therein, and adding 3.2 ml of 9762 PRISM (available from ONDEO Nalco Energy Services, Sugarland, Tex.) acrylate stabilizing agent.

The concentrate was evaluated by measuring the time to crosslink (crosslink time) a fracturing fluid comprising 1.68 pounds per 42 gallon barrel (1.2 g in 250 ml) of completely hydrated hydroxypropyl guar in a 2% by weight potassium chloride solution after adjusting the pH of hydroxypropyl guar solution to eight with sodium hydroxide, and the addition of 0.3 ml (0.12% by volume) of the concentrate.

The crosslink time was measured by creating a vortex in the hydroxypropyl guar solution in a Waring Blender, adjusting the pH, adding the aqueous borate concentrate, and measuring the time for the vortex to close and the top of the fluid to become static.

Duplicate crosslink times were determined initially and after aging the borate concentrate/suspension for five days at ambient temperature. The data are set forth in Table I.

COMPARATIVE EXAMPLE I

An aqueous borate concentrate was prepared as in Example I except that aqueous phase was not pre-saturated with the ulexite. The concentrate was evaluated as in Example I, and the data are set forth in Table 1.

The data clearly indicates the novel feature of the invention whereby saturating the aqueous phase of the borate concentrate produces a borate crosslinking concentrate which immediately imparts a controlled stable, and reproducible crosslink time to fracturing fluids.

TABLE 1

|  | Duplicate Crosslink Times, Minutes: Seconds | |
|---|---|---|
|  | Initial Concentrate | Concentrate Aged 5 Days |
| Example I | 4:21, 4:22 | 4:24, 4:22 |
| Comparative Ex. I | 5:00, 4:42 | 4:23, 4:14 |

The borate concentrates contain from about 30% by weight to about 60% by weight of the sparingly soluble borate, preferably from about 35% by weight to about 50% by weight. Additionally the borate concentrate contains from about 1 ppb (pound per 42 gallon barrel) to about 10 ppb of the suspending agent, preferably from about 4 ppb to about 9 ppb when the suspending agent is a palygorskite clay. The concentration of the stabilizing agent, when present, is such to decrease the API yield point (as defined/measured in the American Petroleum Institute standard API RP 32B) to produce a borate concentrate which exhibits less than 15% syneresis (top aqueous phase separation) and which has a low viscosity and is free flowing on gentle shaking or stirring such that it can be readily removed from its container. Generally the concentration of stabilizing agent is from about 0.5% by volume to about 1.5% by volume.

The fracturing fluids comprise an aqueous medium, a polymeric viscosifier which is capable of being crosslinked with boron, and the sparingly soluble borate crosslinking agent concentrate.

The aqueous medium may be any aqueous liquid generally used to prepare fracturing fluids. Preferred are aqueous solutions containing one or more salts which help to prevent the swelling and dispersion of clays in the formation to be fractured. Such salts include sodium chloride, potassium chloride and calcium chloride. Preferred are aqueous solutions containing from about 0.5% to about 5% by weight potassium chloride, most preferably from about 1% to about 3% by weight.

The polymeric viscosifiers which are useful in the practice of this invention are known polyhydroxy polymers having hydroxyl groups positioned in the cis-form on adjacent carbon atoms. Preferred are galactomannan gums or derivatives thereof. Galactomannan gums as employed in the present invention are those natural gums, derivatives and modifications of galactomannan gums which are characterized as containing a backbone consisting essentially of mannos units having various amounts of galactose units attached to the linear backbone formed by the mannos units. These gums are also characterized as having cis-hydroxyl groups. Many of the useful commercial forms of galactomannans comprise a mixture of polymeric units containing different linear chain lengths and different ratios of galactose units to mannos units. Typical of natural galactomannans which can be employed in he practice of the present invention are guar gum, locust bean gum, gums derived from endosperm seeds such as the sinkas, brazelwood, tara, honey locust, and the like. Well-known modifications can be made to these natural galactomannans to produce various results such as greater stability at elevated temperatures, greater solubility in water at certain temperatures, and the like. Various modifications and derivatives of galactomannans which are useful include, for example, hydroxypropyl guar, hydroxyethyl guar, carboxymethyl guar, carboxymethylhydroxyethyl guar, and carboxymethylhydroxypropyl guar. Preferred are guar gum, hydroxypropyl guar, and carboxymethylhydroxypropyl guar.

Preferably the fracturing fluid will contain from about 1.2 kg/m$^3$ to about 12 kg/m$^3$ of the polymer viscosifier, most preferably from about 2.4 kg/m$^3$ to about 7.2 kg/m$^3$.

The fracturing fluids of this invention are prepared by hydrating the polymeric viscosifier in the aqueous phase and thereafter crosslinking the polymer with the borate. As discussed hereinbefore, crosslinking with boron occurs at a pH above about 8.0. If crosslinking occurs before the polymer is hydrated, full viscosity development from the polymer is unobtainable. Thus it is preferred to use fast hydrating polymer, such as a very finely ground polymer. Various factors affect the rate of hydration of guar and guar derivatives. These include temperature, pH, electrolyte content of the aqueous phase, and degree of dispersion of the guar polymer. The hydration rate decreases as the temperature of the aqueous phase decreases. The hydration rate of guar polymer is decreased dramatically at basic pH particularly above about 8.5. The rate of hydration may be increased or decreased depending on the electrolyte and its concentration in the aqueous medium.

In preparing the fracturing fluids of this invention, all that is required is that the polymer disperse and hydrate in the aqueous liquid before it is crosslinked with the aqueous borate concentrate/suspension regardless of the order of addition of the components of the fracturing fluid to the aqueous liquid carrier.

Once the polymer is dispersed and hydrated, the pH can be adjusted to any desired pH in the range from about 4 to about 10, either buffered or non-buffered, in order to control the crosslinking time of the polymer by the sparingly soluble borate.

The crosslinking of the fracturing fluid must occur before the fracturing fluid reaches the desired location in the well where the subterranean formation is to be fractured. In general, matching of the crosslinking time, or gelation time, with the amount of time required for the fracturing fluid to reach the fracture zone in the wellbore will be controlled by the pumping rate. Normally from 2 to 4 minutes is required, although longer and shorter times may be required. It is preferred that the crosslinking occur as the fracturing fluid is pumped down the well rather than crosslinking the fluid before pumping is initiated. In this case it is imperative that the crosslink time be controlled in a predictable manner.

Various factors affect the crosslinking rate of the fracturing fluids of this invention. They are (1) the characteristics of the polymer, (2) the solubility rate of the borate or mixture of borates used to crosslink and provide high temperature stability, (3) the concentration of borate, (4) the initial pH of the fracturing fluid, (5) the temperature of the fracturing fluid, and (6) the salinity of the fracturing fluid. Thus for any particular aqueous electrolyte solution, temperature, and polymer, the crosslinking rate is controlled by the solubility rate of the borate or mixture of borates, the concentration of the borate, and the initial pH of the fracturing fluid (aqueous phase).

The concentration of sparingly soluble borate should be in the range from about from about 1.5 kg/m$^3$ to about 15 kg/m$^3$, preferably from about 2 kg/m$^3$ to about 10 kg/m$^3$ in the fracturing fluids of this invention.

A method of hydraulically fracturing a formation includes preparing the fracturing fluid as disclosed herein. The pH of the fracturing fluid is adjusted between 8 and 12.5. Next the sparingly soluble boron concentrate is added to the water soluble polymer solution. Finally the fracturing fluid is pumped into the formation under sufficient pressure to cause a fracture in the formation rock. As is typical in hydraulic fracturing operations, proppants designed to maintain highly conductive fractures are usually incorporated into the fracturing fluid, together with other typical additives such as surfactants, emulsion breakers, clay stabilizers, breakers, etc. In hydraulic fracturing, the aqueous borate concentrate of this invention may be diluted prior to addition to the water soluble, crosslinkable polymer solution.

What is claimed is:

1. An aqueous suspension of a sparingly soluble borate comprising a saturated aqueous solution of a sparingly soluble borate, a suspension agent, suspended particles of a sparingly soluble borate, and optionally a stabilizing agent, wherein the suspension agent is selected from the group consisting of palygorskite clays, montmorillonite clays, and colloidal silicas, and wherein the saturated solution of the sparingly soluble borate is prepared prior to the particles of the sparingly soluble borate being suspended therein.

2. The aqueous suspension of claim 1 containing from about 30% by weight to about 60% by weight of the suspended sparingly soluble borate particles, and from about 1 to about 10 pounds per 42 gallon barrel of the suspending agent.

3. The aqueous suspension of claim 2 wherein the sparingly soluble borate is an alkaline earth metal borate or an alkali metal-alkaline earth metal borate containing at least 5 boron atoms per molecule.

4. The aqueous suspension of claim 3 wherein the sparingly soluble borate is selected from the group consisting of ulexite, colemenite, probertite, and mixtures thereof.

5. The aqueous suspension of claim 1 wherein the sparingly soluble borate is an alkaline earth metal borate or an alkali metal alkaline earth metal borate containing at least 5 boron atoms per molecule.

6. The aqueous suspension of claim 5 wherein the sparingly soluble borate is selected from the group consisting of ulexite, colemenite, probertite, and mixtures thereof.

7. The aqueous suspension of claim 1, 2, 3, 4, 5 or 6 wherein the suspension agent is a palygorskite clay selected from the group consisting of attapulgite, sepiolite, and mixtures thereof.

8. The aqueous suspension of claim 7 wherein the stabilizing agent is a low molecular weight synthetic polymeric compound in an amount from about 0.5% by volume to about 1.5% by volume.

9. An aqueous suspension of a sparingly soluble borate comprising a saturated aqueous solution of a sparingly soluble borate, a palygorskite clay suspending agent selected from the group consisting of attapulgite, sepiolite, and mixtures thereof, suspended particles of a sparingly soluble borate, and a stabilizing agent, wherein the sparingly soluble borate is selected from the group consisting of alkali earth metal borates, alkali metal alkaline earth metal borates, and mixtures thereof, and wherein the stabilizing agent is a low molecular weight synthetic polymeric compound and wherein the saturated solution of the sparingly soluble borate is prepared prior to the particles of the sparingly soluble borate being suspended therein.

10. The aqueous suspension of claim 9 wherein the concentration of the suspended sparingly soluble borate is from about 30% by weight to about 60% by weight, wherein the concentration of the suspending agent is from about 4 pounds per 42 gallon barrel to about 9 pounds per 42 gallon barrel, and wherein the concentration of the stabilizing agent is from about 0.5% by volume to about 1.5% by volume.

11. The aqueous suspension of claim 10 wherein the sparingly soluble borate is selected from the group consisting of ulexite, colemenite, probertite, and mixtures thereof, and wherein the suspending agent is attapulgite.

* * * * *